May 30, 1967 R. C. PETERSON 3,321,997
LOAD EQUALIZER
Filed Jan. 14, 1965
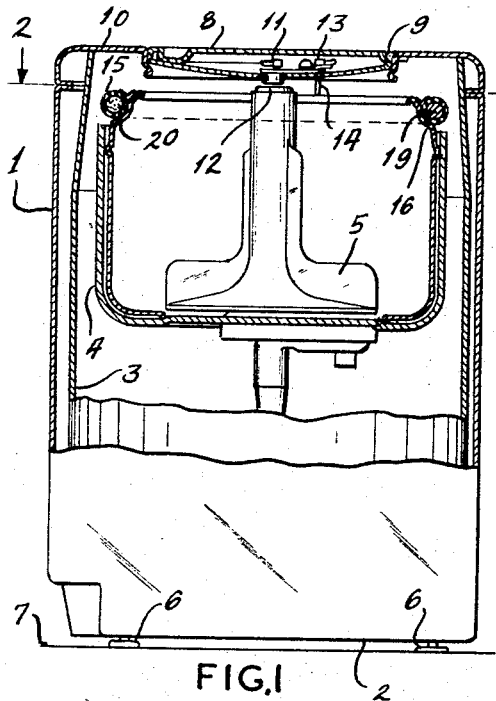
FIG.1
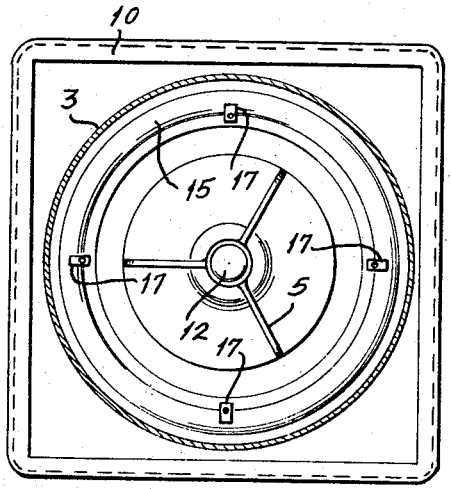
FIG.2
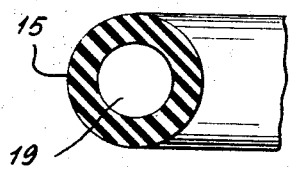
FIG.4
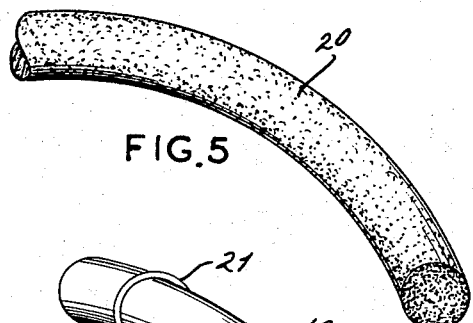
FIG.5
FIG.6
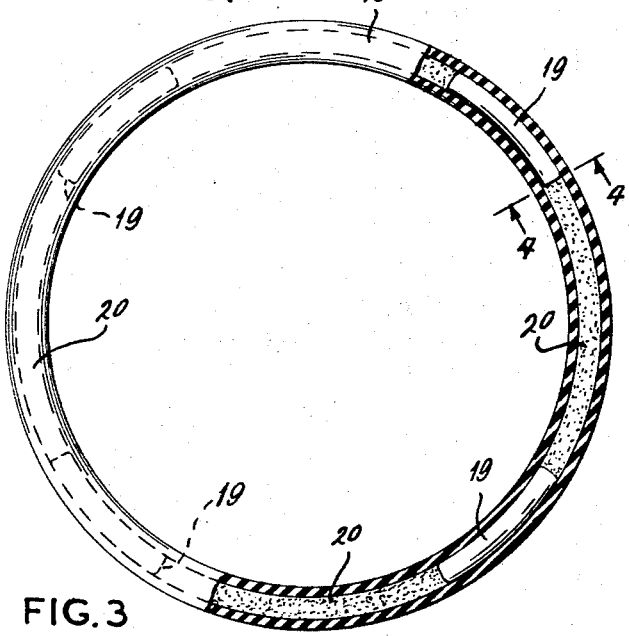
FIG.3
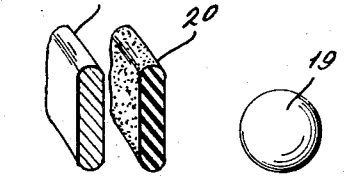
FIG.7a FIG.7b FIG.8
INVENTOR:
Robert C. Peterson United States Patent Office 3,321,997
Patented May 30, 1967

3,321,997
LOAD EQUALIZER
Robert C. Peterson, Oakland, Mo.
(104 Santa Rita Drive, Odessa, Tex. 79760)
Filed Jan. 14, 1965, Ser. No. 425,551
15 Claims. (Cl. 74—573)

This invention relates to load equalizers, and more particularly to load equalizers for containers to be rotated about a vertical axis at a fast rate to extract liquid from material within the container. More specifically the invention is concerned with automatically balancing the load distribution in rotary tub machinery for extracting liquid from material within the tub by rotation about a vertical axis, typically as in vertical tub automatic washing machines.

In vertical tub automatic washing machines, vibration and gyration of the tub occurs during the spinning or extraction cycle because the center of gravity, under unequal distribution of the clothing load within the tub, shifts from the geometrical axis of rotation to a new axis. Various mounting and drive mechanisms have been devised to reduce the effects of unequal distribution and shifting of the center of gravity without success of eliminating the unbalance. Of course, below the critical rotating speed gyration of the washer tub occurs and above the critical speed of the axis of rotation will shift to a new axis of rotation distinct from the normal or geometrical axis. The degree of shift from the normal axis of rotation depends on the degree of unbalance of the clothing load. Thus, the tub tends to rotate about the new center of gravity for the tub which depends on the amount of unequal distribution of the clothing load.

In any rotating machine, a most important example of forced vibration is found in the lateral vibration of the rotating mass. An eccentric rotating mass center will induce lateral vibrations in the mass if the center of gravity of the mass is not at the geometrical axis. The effect is to create a rotating centrifugal force with an X and Y component. If the resultant restoring force due to bending of the mass body (a shaft) and deflection of the bearings is the same, the motions have the same frequency and resonance occurs. The angular velocity under such condition is the critical speed and the amplitude may become very large. Below critical speed the centrifugal force rotates in the same direction as the mass body and above critical speed in the opposite direction as the mass body. A more detailed discussion of forced vibration and its relationship to critical speed or resonance speed may be obtained from among others the following publications: Mechanical Vibrations by J. P. D. Harlog, Fourth edition, 1956, McGraw-Hill Book Company, Inc. especially chapter 2, section 2.7 entitled Forced Vibration Without Damping; Practical Solution of Torsional Vibration, volume II, Amplitude Calculations, by Wiker Wilson, 1963; and Schaum's Outline of Theory and Problems of Machine Design by Hall, Holowenks & Laughlin, Schaum Publishing Co.

Previous methods of dealing with the unbalance problem have included placing a tubular ring about the outer periphery of the tub and filling the ring with loosely packed steel wool and liquid. The deficiency in this system occurs below the critical speed in that such technique increases gyration. The balancing tubular ring idea was further explored with the result that a thixotropic material was added to the ring which remained gelled below the critical speed and became fluid above the critical speed. The problems and proposed solutions are fully set forth in U.S. Patent No. 2,836,083. Moreover, such patent adequately describes typical vertical tub automatic washing machines.

The use of thixotropic material in a tubular ring still fails to operate as a load equalizer or balancer below the critical speed of the rotary tub because the material is a gel. As disclosed in the aforementioned patent, the use of thixotropic material must be such that it remains gelled through the critical speed to prevent adding to the unbalance gyrations. Furthermore, thixotropic materials suitable for use in the balancing ring are organic materials such as actylene tetra bromide, and hence are undesirable.

Consequently, in order to decrease unbalance during the period of gyration below the critical speed, it is essential to dampen movement of the equalizing mass without complete immobility thereof. Thus, as the washer tub begins to gyrate, slow movement of the mass tends to shift and equalize the tub load without overshifting and adding to excessive gyration. Heretofore no mechanism or load equalizer has been proposed which functions to equalize the washer load during gyration occurring below the critical speed.

The present invention avoids most of the difficulties in load equalizing, such as increasing gyration and using an organic thixotropic material. Such an improvement is achieved by providing a tubular anchor ring encircling the uppermost outer periphery of the washer spin tub that contains mass members and compressible separator members within the annulus of the tubular anchor ring. The internal peripheral surface of the ring is preferably provided with a low friction material such as Teflon or itself of low friction material. The mass members preferably are low friction members and may take the form of high density arcuate sectors, balls, etc. which may be coated with a low friction material such as Teflon or encircled with Teflon O-rings. Of course, the exact sequence and number of mass members and separator members may vary depending on the mass necessary to compensate in a given automatic washer design. The separator members preferably are low density, cellular material such as resilient polyurethane foam. The functioning of the invention occurs as the rotational speed of the spin tub increases near the critical speed with the mass members, under the influence of linear force created by rotation of the tub about its normal axis carrying an unsymmetrical clothing load, translating in relation to the tubular anchor ring against the separator members to redistribute the overall spin tub load. As the spin tub exceeds the critical speed of rotation, the mass members seek a position within the anchor ring which affords the optimum symmetry of the spin tub load with respect to the normal axis of rotation of the spin tub. Therefore, the new axis of rotation resulting from nominal unbalance closely approaches the normal or geometrical axis of the spin tub.

It will be appreciated that the density of the foam separators may be picked to adjust the balancing initiating force in relation to the critical speed and the density of the mass members. In this manner, the requirements to afford load equalizing may be achieved for a given automatic washer size and capacity.

It is therefore an important object of the invention to provide a load equalizing member for rotatable containers in centrifuging machines, yet does not accentuate gyration near the critical rotating speed;

It is another object of the invention to provide a load equalizer for vertical spin containers in centrifuging machines for dampening vibration and controlling vibration, operating through and beyond the critical speed without accentuating gyration;

It is another object of the invention to provide a load balancing system for centrifuging machine containers which includes movable mass members and yieldable separator members operating within a tubular ring to equalize unbalance forces of a load undergoing centrifuging;

It is another object of the invention to provide a load equalizer for vertical spin automatic washing machines for countervailing unequal load distribution during spin cycles, yet does not accentuate gyration near the critical rotating speed;

It is yet another object of the invention to provide a load equalizer for a vertical spin tub automatic washer that utilizes a shifting mass to offset any unequal load distribution in the tub during spin cycles;

It is still another object of the invention to provide a balance system for vertical spin tub automatic washers for dampening and controlling vibration active through and beyond the critical speed without accentuating tub gyration and suppressing such gyration;

It is still yet another object of the invention to provide a balancing system for vertical spin tub automatic washers which includes moving mass members and yieldable separator members operating within a tubular toroid encircling the upper outer periphery of the spin tub to equalize the load distribution;

These and other objects and advantages of the invention will be more fully appreciated from the ensuing description taken in conjunction with the appended claims and the drawings wherein;

FIG. 1 is a partially sectioned side view of a washer including the invention,

FIG. 2 is a sectional view taken along the line 2—2 of FIG. 1;

FIG. 3 is a plane view, partly in section, of the load equalizer tubular ring;

FIG. 4 is a fragmentary sectional view of the torodial ring appertaining to the invention;

FIG. 5 is a fragmentary perspective view of the foam separator member appertaining to the invention;

FIG. 6 is a fragmentary perspective view of the mass member with optional Teflon O-rings appertaining to the invention;

FIG. 7 illustrates in fragmentary perspective optional configurations of complementary mass members 7a and separator member 7b;

FIG. 8 depicts a ball mass member used with the foam separator of FIG. 5.

Although the invention is being disclosed in the embodiment of a vertical spin tub automatic washers, it is readily apparent that it is aplicable to many other vertical spin containers in centrifuging machines.

Referring now to the drawings and in particular FIGS. 1 and 2, the washing machine includes a housing or cabinet 1 which completely encloses the various parts of the washing machine and is supported on the base structure 2 which supports the outer tub structure 3. A rotary inner container or tub 4 is mounted within the outer tub 3 and is provided with an agitator or washing device 5. The agitator 5 is operated by a suitable mechanism (not shown). The rotatable tub and agitator assembly are suitably supported by base structure 2. The base structure affords appropriate resilient mounting (as set forth in the aforenamed U.S. Patent No. 2,836,083) of the inner tub 4 and associated mechanisms that may be operated for various washing cycles and extraction cycles as are typical currently. The base structure 2 is suitably provided with adjustable legs 6 for leveling the outer or stationary tub 3 and inner or spin tub 4 on a supporting foundation or floor 7. These adjustable legs 6 are provided to maintain the washing machine level with the floor while tending to prevent any vibrations which may be set up in the machine during operation. Of course, if desired, any suitable locking means may be provided to lock the adjustable legs in the proper position. Access to the inside of the inner or spin tub 4 is provided by a suitable cabinet door 8 supported by hinges 9 on the cabinet top 10. The door includes a suitable water level control mechanism 11 associated with the agitator cap 12 which controls the fluid fill level for a preselected load. Also, access door 8 houses safety shut off mechanism 13 which stops or interrupts cycling of the washer whenever the access door 8 is opened, as well as safety latch 14 which activates safety shut off 13 when struck by agitator 5 if excessive gyration occurs during the spin cycle. Furthermore, the washing machine includes stabilizing springs to aid in absorbing energy of gyration and vibration and cooperates with the load equalizer. For a more detailed description of the suitable washer appertaining to the invention, see U.S. Patent No. 2,836,083, granted to T. R. Smith, assignor to the Maytag Company, May 27, 1958.

Encircling the outer, upper periphery of inner tub 4 is a tubular anchor ring or toroid 15, held in position against converging outer wall 16 of inner tub 4 by brackets 17. The toroid 15 has a relatively smooth interior and may be made of any suitable material such as aluminum coated with Teflon or may be made of Teflon or other low friction material. Supported within toroid 15 is a series of mass members 19 (see FIG. 3) which may be of any high density substance such as lead or steel, and are preferably coated with Teflon or other suitable material or may be encircled with a low friction O-ring. Teflon is a highly successful material for the low friction quality. The mass members 19 are biased apart or separated by low density separators 20 which are of a compressible yet resilient material, such as urethane foam which may have either an open or closed cellular structure. Resilient, expanded polystyrene may also be used for the low density separators 20. The exact density of the separator members may vary over a wide range depending on the particular washing machine. However, it is desirable that the separators 20 have a density suitable to compress to half the normal or unstrained length at, near or above the critical speed of rotation of the spin tub 4 without accentuating the gyration occurring at the critical speed. Hence, for the best balancing the mass members assume a position, compressing the separators 20, at an optimum overall load equalizing location in the toroid 15, preferably below the critical speed and maintain such position through the critical speed gyration and after the spin tub has achieved a new axis of rotation. With such operation of the mass members, the spin tub will seek a new axis of rotation, but such an axis very nearly coincides with the normal or geometric axis of the spin tub 4.

FIG. 3 illustrates the toroid 15 with arcuate sectors of high density as mass members 19 separated by arcuate sectors of low density foam material as separators 20. Separators 20 and mass members 19 have relatively flat abutting ends, and preferably the separator 20 ends are slightly larger than the mass member 19 ends to prevent the mass members 19 from overriding the ends of the separators 20 and jamming in the toroid 15. Optionally, the separators 20 may have flat discs secured to their ends or be treated or coated with suitable hardenable material to prevent unequal distribution of pressure thereover. An enlarged, unproportioned sectioned view of the toroid 15 is depicted in FIG. 4. The toroid 15 as depicted has a circular cross section, however such is not essential to the invention. In FIG. 5, an arcuate sector, foam separator member 20 is depicted which may be used in the toroid 15 of FIG. 3. An arcuate sector, mass member 19 is illustrated in FIG. 6 which has optional O-rings 21 to provide a low friction sliding rib. Preferably, the O-rings 21 are made of Teflon, and the O-rings seat over a reduced size mass member to facilitate translation within and relative to the toroid 15.

Throughout, the invention has been disclosed with a circular cross section torus, however, the toroid 15 may take most any shape in cross section. For example, FIG. 7 illustrates complementary mass member 7a and separator member 7b, suitable for operation in a relatively flat, elongated cross section torus or ring. FIG. 8 illustrates a ball or sphere suitable as a mass member.

In an embodiment of the invention actually construed and successfully operated through many washing cycles, toroid 15 was made of rigid and high impact type polyvinylchloride and had an outer diameter of about 20½ inches with a nominal cross sectional, internal diameter of 1½ inches. During forming of the ring, the width diameter was reduced to about 1.4 inches and the height diameter was increased to about 1.6 inches. The internal bore was relatively smooth. The tubular ring 15 was positioned in the bottom interior of a washer tub similar to spin tub 4. The ring 15 had 20 Atlas polishing balls distributed therein, separated by expanded polystyrene separators. The foam separators were straight cylinders about 2½ inches long and 1⅛ inch diameter with a ⅛ inch diameter central bore the density of about 5 lbs./ft.³. Foam hair rollers were used for these separators as such were available. The Atlas steel polishing balls were 1¼ inch diameter and weighed about ⅓ of a pound. Several sequences were used with good success in all cases. One successful arrangement was five sets of four balls each separated by five inches of the foam between each set of four balls.

Although preferably the exact density of foam separators may vary from less than one (1) pound per cubic foot to over ten (10) pounds per cubic foot, it is only important that the mass member weight, separator member density, and the speed of rotation and capacity of the washer be correlated so that the mass members will shift sufficiently to equalize any washer load unbalance.

It will be apparent from the foregoing that many changes and modifications may be made to the load equalizer tubular toroid system which will be apparent to those skilled in the art, hence, all such changes are deemed to be within the scope and spirit of the invention which is limited only as necessitated by the scope of the appended claims.

I claim:

1. In a vertical spin tub automatic washing machine, a load equalizer comprising a carrier member encircling and secured to rotate with the spin tub, mass members retained by said carrier member peripherally translatable thereto and compressible, countervailing separator members disposed between mass members for urging said mass members apart.

2. In a vertical tub, spin extractor type automatic washing machine, a load equalizer comprising a toroidal member secured to the vertical tub and encircling the upper outer periphery thereof, mass members disposed within said toroidal member and peripherally translatable thereto, and compressible, countervailing low density spacer members interposing some of said mass members.

3. In a vertical spin tub automatic washing machine, a load equalizer comprising a tubular carrier member encircling and secured to rotate with the spin tub, high density mass members retained within said carrier member peripherally translatably thereto and compressible low density countervailing, foam members for separating said mass members.

4. In a vertical tub, spin extractor type automatic washing machine, a load equalizer comprising an oval toroidal member encircling and secured to the vertical tub concentric therewith, oval cross section mass members retained by said toroidal member peripherally translatably thereto, and compressible, low density countervailing, separator members interspersed with some of said mass members.

5. In a vertical tub, spin extractor type automatic washing machine, a load equalizer comprising a toroidal member secured concentrically to the vertical tub and encircling the upper outer periphery thereof, arcuate mass sectors disposed therein and peripherally translatable thereto, and compressible low density, countervailing foam members interposing some of said mass sectors to urge said mass sectors apart.

6. The load equalizer of claim 5 wherein the toroidal member has an oval cross section and the mass sectors have an oval cross section.

7. In a vertical spin tub automatic washing machine, a load equalizer comprising a toroidal member encircling and secured concentrically to the spin tub rotatably therewith, high density arcuate mass sectors retained by said toroidal member peripherally translatably thereto and compressible, arcuate, countervailing foam members for separating said mass sectors.

8. In a vertical tub, spin extractor type automatic washing machine, a load equalizer comprising a circular toroidal tube secured to the vertical tub and concentrically encircling the upper outer periphery thereof, circular cross section high density mass members disposed within said tube and peripherally translatable thereto, and circular cross section, low density, compressible, countervailing foam members interposing some of said mass members to urge said mass members apart.

9. In a vertical spin container type centrifugal liquid extractor, a load equalizer comprising a circular toroidal tube secured concentrically to the container, mass balls retained within said tube and translatable therein relative to said tube, and yieldable low density foam members interposing said mass balls to urge said mass balls apart.

10. In a vertical spin tub automatic washing machine, a load equalizer comprising a continuous circular tube secured concentrically to the spin tub, mass balls disposed within said circular tube and yieldable foam members separating said mass balls.

11. In a vertical tub, spin extractor type automatic washing machine, a load equalizer comprising a toroidal member secured concentrically to the vertical tub and rotatable therewith, mass balls disposed within said toroidal member, and low density resilient foam members interspersed with some of said mass balls.

12. The load equalizer of claim 11 wherein said foam members have rigid end faces.

13. In a vertical tub, spin extractor type automatic washing machine, a load equalizer comprising a circular toroidal tube secured to the vertical tub and encircling the upper outer periphery thereof, mass balls disposed in said toroidal tube and translatable thereto, and circular cross section yieldable low density foam members interposing some of said mass balls.

14. The load equalizer of claim 13 wherein said foam members have rigid end portions.

15. In a vertical spin, automatic washing machine, a load equalizer comprising a carrier member encircling and secured to rotate with the spin tub, mass members retained by said carrier member peripherally translatable thereto, and compressible, countervailing separator members disposed between some mass members for urging interposed mass members apart.

References Cited

UNITED STATES PATENTS

| | | | |
|---|---|---|---|
| 540,925 | 6/1895 | Roy | 74—573 |
| 1,183,745 | 5/1916 | Ledyard | 74—573 |
| 2,801,883 | 8/1957 | Householder | 74—573 |
| 2,836,083 | 5/1958 | Smith | 74—573 |
| 3,017,223 | 1/1962 | Morrill | 74—573 |

FRED C. MATTERN, Jr., *Primary Examiner.*

W. S. RATLIFF, *Assistant Examiner.*